United States Patent
Lin et al.

(10) Patent No.: US 12,489,750 B2
(45) Date of Patent: Dec. 2, 2025

(54) USER PERMISSION IN A MULTI-TENANT ENVIRONMENT

(71) Applicant: Microsoft Technology Licensing, LLC, Redmond, WA (US)

(72) Inventors: Chun Hung Lin, Bellevue, WA (US); Vikas Ahuja, Sammamish, WA (US); Matthias Leibmann, Redmond, WA (US); Anshul Dube, Redmond, WA (US); Shankaranand Arunachalam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 18/032,100

(22) PCT Filed: Oct. 15, 2021

(86) PCT No.: PCT/US2021/055237
§ 371 (c)(1),
(2) Date: Apr. 14, 2023

(87) PCT Pub. No.: WO2022/115176
PCT Pub. Date: Jun. 2, 2022

(65) Prior Publication Data
US 2023/0396615 A1    Dec. 7, 2023

(30) Foreign Application Priority Data
Nov. 27, 2020 (LU) .................................. LU102236

(51) Int. Cl.
*H04L 9/40* (2022.01)

(52) U.S. Cl.
CPC ...... *H04L 63/0876* (2013.01); *H04L 63/0807* (2013.01); *H04L 63/0815* (2013.01); *H04L 63/105* (2013.01)

(58) Field of Classification Search
CPC ............ H04L 63/0876; H04L 63/0807; H04L 63/0815; H04L 63/105
See application file for complete search history.

(56) References Cited

U.S. PATENT DOCUMENTS 10,382,202 B1 *  8/2019  Ohsie .................. H04L 63/0807
11,853,463 B1 * 12/2023  Hinrichs ............. H04L 63/0807
(Continued)

FOREIGN PATENT DOCUMENTS

EP    3138035 A1    3/2017
EP    3528454 A1    8/2019

OTHER PUBLICATIONS

Wike, et al., "Authentication Flows and Application Scenarios", Retrieved from: http://web.archive.org/web/20200319234152/https://docs.microsoft.com/en-us/azure/active-directory/develop/authentication-flows-app-scenarios, Mar. 3, 2020, 14 Pages.
(Continued)

*Primary Examiner* — Darshan I Dhruv
(74) *Attorney, Agent, or Firm* — Schwegman Lundberg & Woessner, P.A.

(57) ABSTRACT

A cross-tenant authentication system is described. The system receives a user token from a client device that is registered with a first tenant of a service application of a server. The system receives a request, from the client device, to access a second feature of a second tenant of the service application. The second feature of the second tenant of the service application is separate from a first feature of the first tenant of the service application. The second feature is only accessible to devices registered with the second tenant of the service application. The system authenticates the request by validating the user token from the client device and determines a cross-tenant policy of the second tenant of the
(Continued)

service application based on the user token. The system forms an identity object based on the cross-tenant policy.

13 Claims, 8 Drawing Sheets

(56) References Cited

U.S. PATENT DOCUMENTS

| | | | | |
|---|---|---|---|---|
| 2017/0061149 | A1* | 3/2017 | Yuan | H04L 63/102 |
| 2017/0364695 | A1* | 12/2017 | Wong | G06F 21/6218 |
| 2018/0309759 | A1* | 10/2018 | Leibmann | H04L 63/105 |
| 2019/0187881 | A1* | 6/2019 | Beechuk | G06Q 30/01 |
| 2019/0306138 | A1* | 10/2019 | Carru | H04L 9/3247 |
| 2019/0364020 | A1* | 11/2019 | Wardell | H04W 12/069 |
| 2019/0372766 | A1* | 12/2019 | Bahrenburg | H04L 9/30 |
| 2020/0007529 | A1* | 1/2020 | Bahrenburg | H04L 63/08 |
| 2020/0177597 | A1* | 6/2020 | Kabesa | G06F 21/41 |
| 2020/0257700 | A1* | 8/2020 | Xu | G06F 16/213 |
| 2020/0296143 | A1* | 9/2020 | Mohamad Abdul | H04L 65/1073 |
| 2020/0322385 | A1* | 10/2020 | Bombacino | G06F 9/45558 |
| 2021/0211425 | A1* | 7/2021 | Paulus | H04L 63/068 |

OTHER PUBLICATIONS

"Authentication Types", Retrieved from: http://web.archive.org/web/20200803134332/https://helpx.adobe.com/in/coldfusion/api-manager/authentication-types.html, Aug. 3, 2020, 27 Pages.

"Azure AD—Differentiate Between App Token and User Token", Retrieved from: https://stackoverflow.com/questions/36317292/azure-ad-differentiate-between-app-token-and-user-token, Mar. 30, 2016, 3 Pages.

"Multitenancy with Cross-Tenant Users", Retrieved from: https://softwareengineering.stackexchange.com/questions/403274/multitenancy-with-cross-tenant-users, Jan. 3, 2020, 4 Pages.

Coulter, et al., "Azure Lighthouse in Enterprise Scenarios", Retrieved from: https://web.archive.org/web/20200102214200/https://docs.microsoft.com/en-us/azure/lighthouse/concepts/enterprise, Sep. 25, 2019, 4 Pages.

Fitzmacken, Tom, "Authenticate Requests Across Tenants", Retrieved from: http://web.archive.org/web/20210729171604/https://docs.microsoft.com/en-us/azure/azure-resource-manager/management/authenticate-multi-tenant, Oct. 11, 2019, 2 Pages.

"Search Report and Written Opinion Issued in Luxembourg Patent Application No. LU102236", Mailed Date: Aug. 27, 2021, 11 Pages.

"International Search Report and Written Opinion Issued in PCT Application No. PCT/US21/055237", Mailed Date: Jan. 18, 2022, 13 Pages.

Pustchi, Navid, "Authorization Federation in Multi-Tenant Multi-Cloud IaaS", A Dissertation Submitted In The University of Texas At San Antonio In Partial Fulfillment of the Requirements for the Degree of Doctor of Philosophy in Computer Science, May 2016, 113 Pages.

Pustchi, et al., "MT-ABAC: A Multi-Tenant Attribute-Based Access Control Model with Tenant Trust", In Proceedings of International Conference on Network and System Security, Nov. 3, 2015, 15 Pages.

Wike, et al., "Application and Service Principal Objects in Azure Active Directory", Retrieved from: https://web.archive.org/web/20200809094003/https://docs.microsoft.com/en-us/azure/active-directory/develop/app-objects-and-service-principals, Jul. 22, 2020, 7 Pages.

Wike, et al., "How To: Sign In Any Azure Active Directory User Using The Multi-Tenant Application Pattern", Retrieved from: http://web.archive.org/web/20200511193811/https://docs.microsoft.com/en-us/azure/active-directory/develop/howto-convert-app-to-be-multi-tenant, Mar. 17, 2020, 11 Pages.

Communication 71(3) Received for European Application No. 21798528.2 mailed on Nov. 8, 2023, 8 pages.

Decision to Grant pursuant to Article 97(1) Received for European Application No. 21798528.2, mailed on Jan. 11, 2024, 02 pages.

Office Action Received for Chinese Application No. 202180079269.1, mailed on Sep. 12, 2025, 9 pages. (English Translation Provided).

* cited by examiner

```
┌─────────────────────────┐
│   RECEIVE ACCESS TOKEN  │
│ FROM CLIENT DEVICE 502  │
└───────────┬─────────────┘
            ▼
┌─────────────────────────┐
│  DETERMINE A REQUEST TO │
│ ACCESS SERVICE OF ANOTHER│
│       TENANT 504        │
└───────────┬─────────────┘
            ▼
┌─────────────────────────┐
│  AUTHENTICATE THE REQUEST│
│  BY VALIDATING THE ACCESS│
│       TOKEN 506         │
└───────────┬─────────────┘
            ▼
┌─────────────────────────┐
│   IDENTIFY CROSS-TENANT │
│  POLICY BASED ON ACCESS │
│       TOKEN 508         │
└───────────┬─────────────┘
            ▼
┌─────────────────────────┐
│   FORM IDENTITY OBJECT  │
│ BASED ON CROSS-TENANT   │
│       POLICY 510        │
└─────────────────────────┘
```

USER PERMISSION IN A MULTI-TENANT ENVIRONMENT

CLAIM OF PRIORITY

This application is a U.S. National Stage Filing under 35 U.S.C. 371 of International Patent Application Serial No. PCT/US2021/055237, filed Oct. 15, 2021, and published as WO 2022/115176 A1 on Jun. 2, 2022, which application claims the benefit of priority to Luxembourg Patent Application No. LU102236, filed Nov. 27, 2020, which applications and publication are incorporated herein by reference in their entirety.

TECHNICAL FIELD

The subject matter disclosed herein generally relates to managing resource access from users in a multi-tenant environment. Specifically, the present disclosure addresses systems and methods for authenticating and providing access permission for cross-tenant users to services in the multi-tenant environment.

BACKGROUND

A server can provide services from a service application to users of different organizations. Users of an organization are authenticated to access resources assigned to their respective organization. A user of one organization may seek access to a resource (e.g., a file stored in a storage location) allocated to another organization. One solution includes providing a guest account to the user. However, the process of adding guest accounts requires manually creating new guest accounts and adding each guest account individually. As such, if a user is a guest to three different organizations, he/she will need to maintain and switch between three different accounts when accessing resources of the different organizations.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural Components, such as modules) are optional and may be combined or subdivided, and operations (e.g., in a procedure, algorithm, or other function) may vary in sequence or be combined or subdivided.

The present application describes a system for enabling cross-tenant access to shared resources. The term "tenant" is used herein to refer to a representation of an organization with respect to a service application. A tenant may be a dedicated instance of a cloud-based identity and access management service that an organization or an application developer receives. The cloud-based identity and access management service enables users of an organization to sign in and access resources in external resources (e.g., Microsoft 365™, SaaS applications) and internal resources (e.g., application within an organization network and intranet, cloud applications developed by the organization). In another example, a tenant represents a container for items of an organization such as users, domains, subscriptions, groups, that operate within a larger environment (e.g., Microsoft Office 365 Data Centers).

In the multi-tenant environment, each tenant may be represented as a silo. Users of a tenant access resources such as mailboxes, groups, files within their own tenant. In other words, users authenticate into the same tenancy that is a resource resides. As access to resource also requires authorization to the resource, these authorizations are also given in context of the tenant the user authenticates.

Because the access pattern remains the same within the same tenancy, there is no distinction between a tenant under which a user is authenticated against (e.g., a home tenant) and in what tenant the resource resides that the user tries to access (e.g., a resource tenant). The permissions that a user obtains for accessing resources of a home tenant are included as part of an access token to the home tenant as the result of the successful authentication into the home tenant.

However, authorizations being granted to an application in the same resource context that the user authenticates to no longer holds true with sharing resources between tenants. The permissions that are included in an access token as the result of successful authentication are no longer applicable for accessing a resource tenant because the home tenant is no longer same as the resource tenant.

In addition, resource tenant administrators desire the ability to configure what resource is sharable or accessible outside of their tenancy. For instance, these administrators may not understand how to configure permission maps to access individual Application Programming Interfaces (APIs). For example, administrators are typically aware of higher level concept such as access capability (e.g. "Allow Free/Busy" or "Allow Group Access") and can specify capabilities to configure what tenant resource is sharable. However, when a capability is configured to be sharable, it can mean that multiple services and APIs can be called. Thus, different permission are required to be included in the request to trigger a specific capability.

The present application describes a system that enables access to resources for users that sign-on into a different home-tenant and provide that this kind of access stays secure and manageable. To achieve these features, the system performs two main operations: (1) remove permissions that are included as the result of successful authentication (e.g., where authorization to application was given to access resources in the same tenant) and (2) re-establish/rehydrate permissions in a request for cross-tenant resource access as the result of successful authorization based on administrator-controlled rules. The present application further describes a system that maps the concept that tenant administrator understands, capability, to a concept that an API understand and corresponding permission. The permission can be added dynamically when a request is made to access different resources.

Each service (API) owner provides a configuration to map capability to permission its API understands and enforces for the required authorization to grant access to resources. Such configuration is then used and enforced to rehydrate permissions so that the resource can be accessed securely with minimum configuration from tenant administrator or the service (API) owner.

In one example embodiment, a system and method for cross-tenant authentication is described. A computer-implemented method comprising: receiving a user token from a client device that is registered with a first tenant of a service application of a server, the user token being provided to the client device by a directory service application after validating the client device; receiving a request, from the client device, to access a second feature of a second tenant of the service application, the second feature of the second tenant of the service application being separate from a first feature of the first tenant of the service application, the second feature being only accessible to devices registered with the second tenant of the service application; authenticating the request by validating the user token from the client device; in response to validating the user token, determining a cross-tenant policy of the second tenant of the service application based on the user token; and forming, at the server, an identity object based on the cross-tenant policy, the identity object comprising a permission value of a permission attribute that identifies a level of access to the second feature of the second tenant of the service application to the client device.

As a result, one or more of the methodologies described herein facilitate solving the technical problem of providing cross-tenant access to services from service application configured for other tenants. As previously described, the present application solves the problem of forming different individual accounts to access different tenants, the lack or difficulty in configuring guest permissions, the lack of a centralized system to manage resource sharing that is auditable. For example, a resource can be shared using other mechanism such as email (by forwarding internal document) or third-party application (using third party application to communicate with users outside the tenant). Although both initialized by the end user, the tenant administrator loses control of the tenant resource. As such, one or more of the methodologies described herein may obviate a need for certain efforts or computing resources (e.g., creating additional individual guest accounts). Examples of such computing resources include Processor cycles, network traffic, memory usage, data storage capacity, power consumption, network bandwidth, and cooling capacity.

Figure 1:
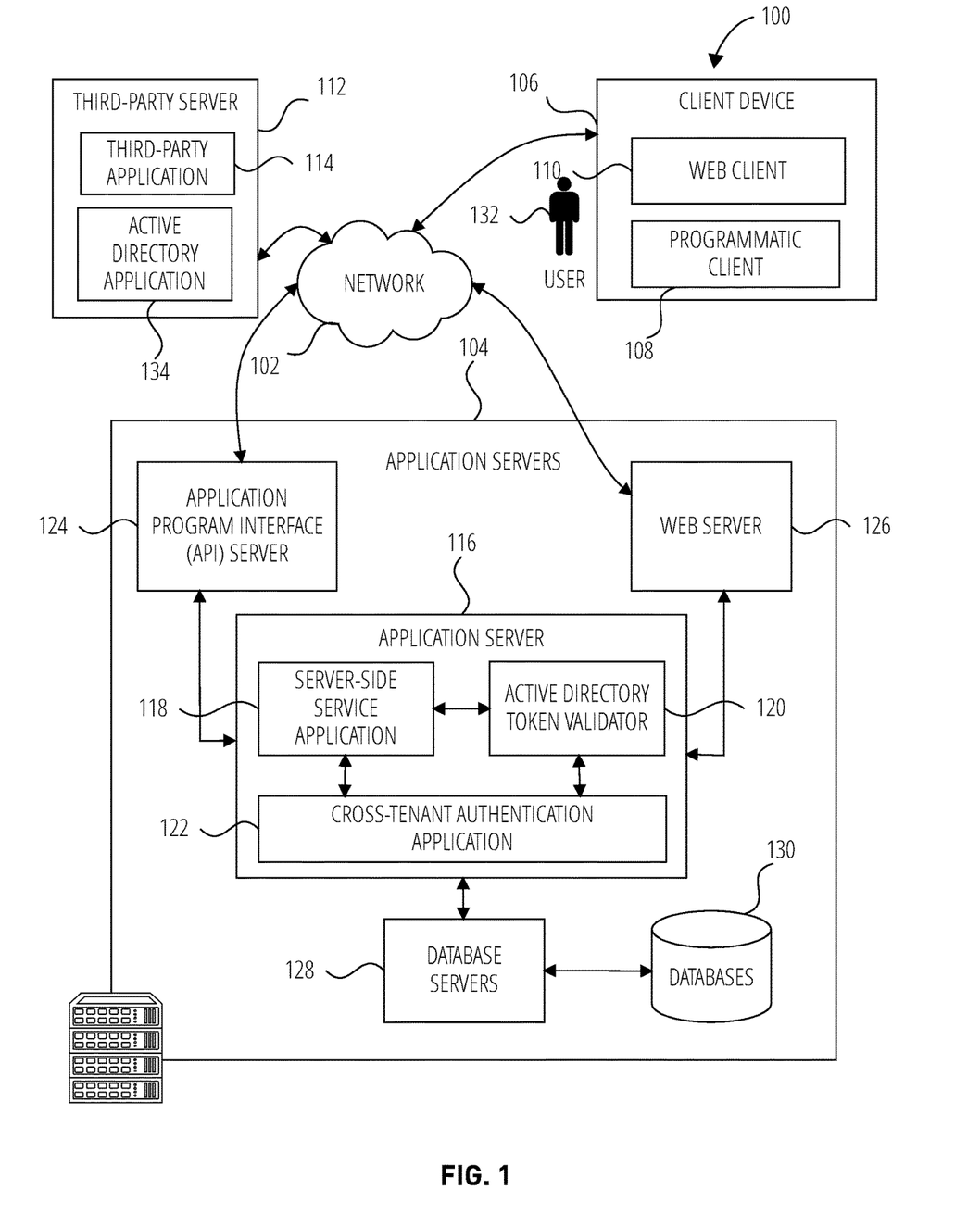
FIG. 1 is a diagrammatic representation of a networked environment in which the present disclosure may be deployed, in accordance with some example embodiments.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. The client device 106 includes a web client 110 (e.g., a browser), a programmatic client 108 (e.g., a communication application such as Microsoft Teams™, a cross-tenant policy configurator application, a document writing application, a shared document storage application) that is hosted and executed on the client device 106. The policy configurator application may operate with the web client 110 and/or the programmatic client 108. In another example embodiment, the policy configurator is part of the programmatic client 108 or web client 110.

An Application Program Interface (API) server 124 and a web server 126 provide respective programmatic and web interfaces to application servers 104. A specific application server 116 hosts a server-side service application 118, an active directory token validator 120, and a cross-tenant authentication application 122. Each application may further include additional Components, modules, and applications.

The server-side service application 118 includes, for example, a server side email/calendar enterprise application, a server side instant message enterprise application, a document authoring enterprise application, or a shared document storage enterprise application. The service application 122 enables users of an enterprise (e.g., a tenant of the server-side service application 118) to collaborate and share document, messages, and other data (e.g., meeting information, common projects) with each other. For example, the user 132 at the client device 106 accesses and uses the server-side service application 118 to edit documents that are shared with other users of the same tenant or other users of another tenant. In another example, the client device 106 accesses and uses the server-side service application 118 to retrieve or send messages or emails to and from other peer users of the same or different tenant. Other examples of server-side service application 118 includes enterprise systems, content management systems, and knowledge management systems.

The active directory token validator 120 validates a token issued by a directory service application (e.g., active directory application 134). The active directory application 134 may be located at the application servers 104 or at a third-party server 112. The active directory application 134 includes a cloud-based identity and access management service (e.g., Microsoft Azure Active Directory) that helps enterprise users sign in and access resources in (1) external resources (e.g., Microsoft 365, SaaS applications) and (2) internal resources, such as applications on an organization network or intranet, along with any cloud applications developed by the organization. As such, the active directory token validator 120 can be used to authenticate a user of the organization by validating the user token (e.g., Native Federation token) to the user.

The cross-tenant authentication application 122 enables sharing of resources between users of different tenant. In one example, the cross-tenant authentication application 122 performs an authentication process that enables the user of a first tenant to access resources from a second tenant without having to create a new individual guest account for the user of the first tenant. In one example, the active directory token validator 120 authenticates the user of the first tenant based on a validation of the user token provided by the client device 106 (the active directory application 134 provided the user token to the client device 106). Once the active directory token validator 120 validates the user token, the cross-tenant authentication application 122 accesses a policy library to identify access/permission rights for the user and the second tenant. The cross-tenant authentication application 122 forms an identity object for the user based on the permission rights retrieved from the policy library for the user. The user 132 can then access services from the server-side service application 118 according to the rights defined in the identity object.

In another example embodiment, the cross-tenant authentication application 122 enables a tenant administrator to configure and specify different levels of access/permissions to services from the second tenant for the user of the first tenant. For example, the tenant is provided with access to a particular communication channel provided by the server-side service application 118 but cannot perform a user directory search operation with the server-side service application 118. Example components of the cross-tenant authentication application 122 are described further below with respect to FIG. 3.

The server-side service application 118, the active directory token validator 120, and the cross-tenant authentication application 122 communicate with the programmatic client 108 via the programmatic interface provided by the Application Program Interface (API) server 124. In another example, the server-side service application 118, the active directory token validator 120, and the cross-tenant authentication application 122 communicate with the web client 110 via the web server 126.

The application server 116 is shown to be communicatively coupled to database servers 128 that facilitates access to an information storage repository or databases 130. In an example embodiment, the databases 130 include storage devices that store information to be processed by the server-side service application 118, the active directory token validator 120, and the cross-tenant authentication application 122. In another example embodiment, the databases 130 include storage devices that store cross-tenant application permission maps configured by the cross-tenant authentication application 122.

The third-party application 114 stores the active directory application 134 and a third-party application 114. The third-party application 114 executing on a third-party server 112 is shown as having programmatic access to the application server 116 via the programmatic interface provided by the Application Program Interface (API) server 124. For example, the third-party application 114, using information retrieved from the application server 116, may support one or more features or functions on a website hosted by the third party. In another example, the third-party server 112 may store the cross-tenant application permission maps configured by the cross-tenant authentication application 122. In yet another example, the third-party application 114 may store the server-side service application 118, the active directory token validator 120, or the cross-tenant authentication application 122.

Figure 2:
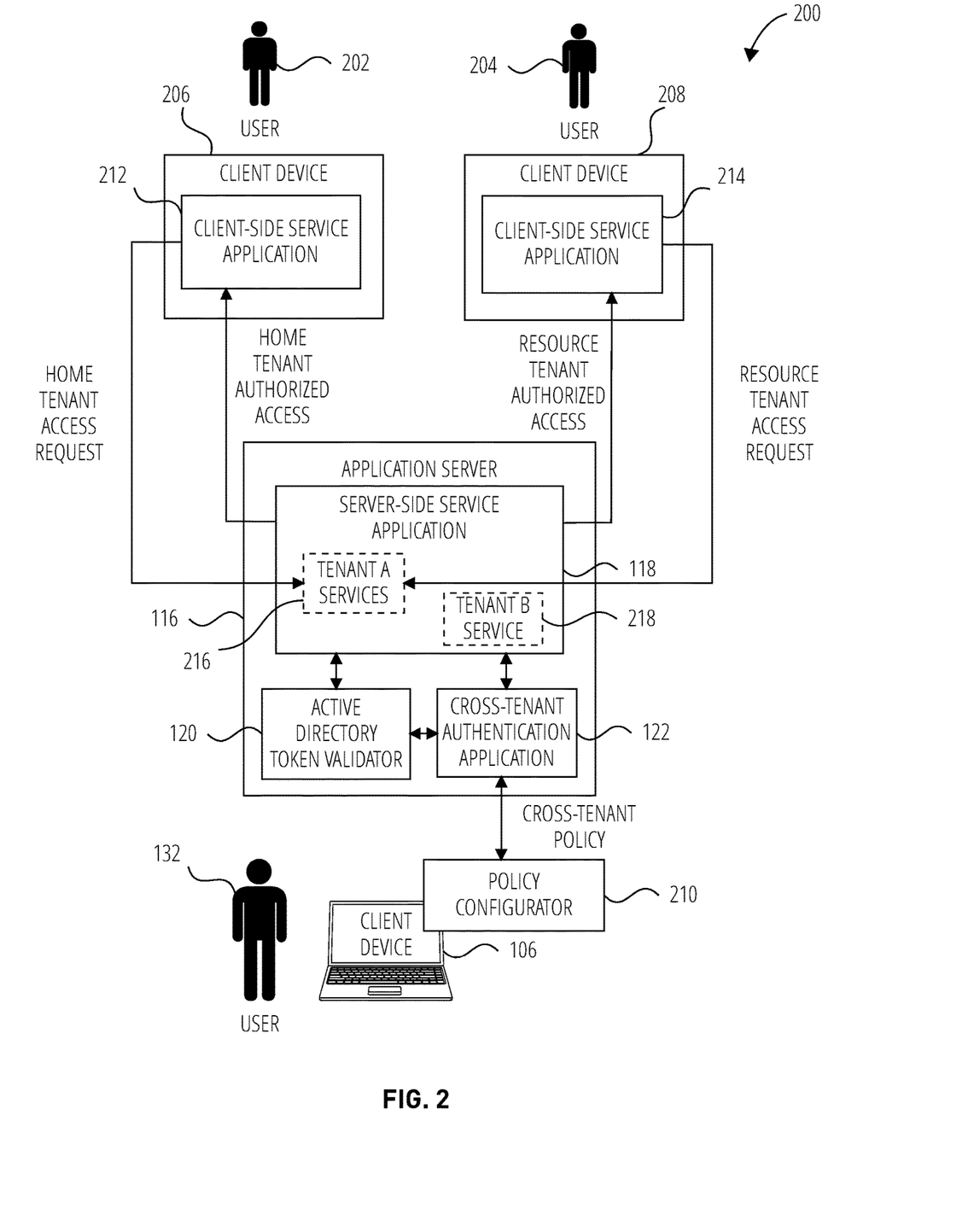
FIG. 2 is a block diagram illustrating an example of an operation of the cross-tenant authentication application in accordance with one example embodiment.

FIG. 2 is a block diagram illustrating a network environment 200 illustrating operations of the cross-tenant authentication application 122 in accordance with one example embodiment. The network environment 200 includes a client device 206, a client device 208, the application server 116, the client device 106.

The user 132 may be an administrator of a tenant (e.g., tenant B). The user 132 operates the client device 106 using a policy configurator 210 to define cross-tenant policies and to set rights/permissions for the users outside tenant B. For example, the user 132 defines a cross-tenant policy for tenant B that allows other user tenants to read a shared communication channel provided by the server-side service application 118. The user 132 may further operate the policy configurator 210 to define that users outside tenant B cannot search or view a directory of users of tenant B. The policy configurator 210 communicates with the cross-tenant authentication application 122 to define attribute values of permission attributes stored in a cross-tenant policy library. In one example embodiment, the cross-tenant policy library defines access rights to tenant B for all user tenant outside tenant B. In another example embodiment, the cross-tenant policy library defines access rights to tenant B for a specific user tenant outside tenant B. In yet another example embodiment, the cross-tenant policy library defines access rights to tenant B for user of a specific tenant (e.g., tenant A).

The user 202 is a user associated with tenant A. The client device 206 includes a client-side service application 212 that accesses tenant A services 216 of the server-side service application 118. For example, the user 202 accesses a file or a communication channel that is only accessible to users of tenant A. To access the file or communication channel of tenant A, the client-side service application 212 sends a home tenant access request to the server-side service application 118. The active directory token validator 120 validates a user token provided by the user 202 to authenticate an identity of the user 202 and confirm that the client device 206 has access to the tenant A services 216. Once the identity of the user 202 is validated along with the corresponding tenant permissions (e.g., user 202 is permitted to read a file from the tenant A services 216), the server-side service application 118 provides the client-side service application 212 with a home tenant authorized access to the tenant A services 216 authorized for user 202.

The user 204 is a user associated with another tenant, tenant B. The client device 208 includes a client-side service application 214 that accesses tenant B service 218 of the server-side service application 118. For example, the user 204 accesses a file or a communication channel that is only accessible to users of tenant B. To access the file or communication channel of tenant B, the client-side service application 214 sends a home tenant access request to the server-side service application 118. The active directory token validator 120 validates a user token provided by the user 204 to authenticate an identity of the user 204 and confirm that the client device 208 has access to the tenant B service 218. Once the identity of the user 204 is validated along with the corresponding tenant permissions (e.g., the user 204 is permitted to read a file from the tenant B service 218), the server-side service application 118 provides the client-side service application 214 with a home tenant authorized access to the tenant B service 218 authorized for user 204.

In one example embodiment, the user 204 seeks to access a shared communication channel from tenant A services 216. The client-side service application 214 sends a cross-tenant request (e.g., resource tenant access request) to the tenant A services 216. The cross-tenant authentication application 122 determines a cross-tenant access request (e.g., the user 204 from tenant B is attempting to access the shared communication channel of tenant A services 216). The active directory token validator 120 first authenticates the user 204 by validating the user token receive from the client device 208. After the user 204 is authenticated, the cross-tenant authentication application 122 accesses a cross-tenant policy library to identify/map the permission/access rights of the user 204 with respect to the tenant A services 216. The cross-tenant authentication application 122 forms an identity object based on the mapped permissions. The tenant A services 216 processes the identity object and provides services from the tenant A services 216 to the client-side service application 214 based on the permission attribute values set forth in the identity object.

Figure 3:
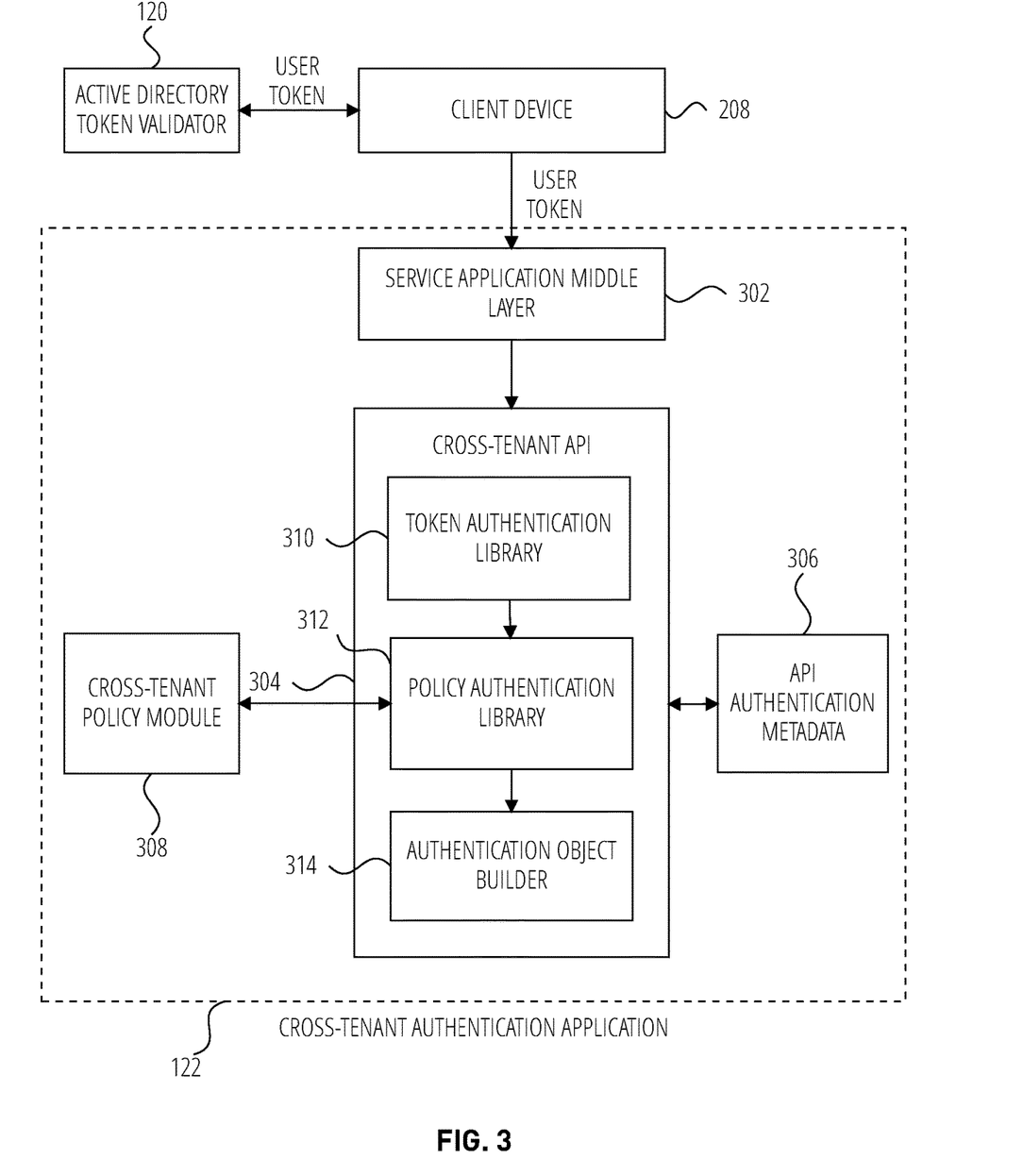
FIG. 3 illustrates a block diagram illustrating components of the cross-tenant authentication application in accordance with one example embodiment.

FIG. 3 illustrates a block diagram illustrating Components of the cross-tenant authentication application 122 in accordance with one example embodiment. The cross-tenant authentication application 122 includes a service application middle layer 302, a cross-tenant API 304, an API authentication metadata 306, and a cross-tenant policy module 308.

The client device 208 is authenticated to access services for a home tenant by obtaining a user token after being authenticated at the active directory token validator 120. The client device 208 uses the same user token to access services of another tenant (e.g., tenant A services 216). As such, the client device 208 does not need to obtain another access token with a new guest account to access services of other tenants. The client device 208 provides the user token to cross-tenant authentication application 122.

The service application middle layer 302 receives the user token and determines a cross-tenant access request from the client device 208 to access services of a tenant different from the tenant associated with the user token. In one example embodiment, the service application middle layer 302 identifies the user 204 of the client device 208, the tenant associated with the user 204 (e.g., tenant B), the tenant associated with the request (e.g., tenant A), the shared service(s) of tenant A).

The cross-tenant API 304 includes a token authentication library 310, a policy authentication library 312, and an authentication object builder 314. The client device 206 includes metadata (e.g., substrate API authorization metadata) that indicate whether tenant A has opted to share services of the tenant A. The following code illustrates an example of substrate API Auth metadata:

```
CrossTenantAccessEnabled: true
CorssTenantCapabilityPermissionMap [{
    AllowSharedChannel :
        Groups.ReadWrite.All
}]
```

The API authentication metadata 306 may be stored in a permission map of cross-tenant capability. For example, the permission map indicates whether access to a shared service from another tenant is allowed.

The token authentication library 310 authenticates the cross-tenant requests and invokes the policy authentication library 312 after authenticating the user 204. For example, the token authentication library 310 validates the user token provided by the user 204 and verifies that the permission rights of the services of tenant B are enabled. Upon validation of the user token, the token authentication library 310 invokes a policy check process of the policy authentication library 312.

The policy authentication library 312 accesses a cross-tenant policy module 308 to determine the cross-tenant access policies and to prevent against cross-tenant data leak. For example, the cross-tenant policy module 308 identifies whether a user of tenant A can perform certain functions or has access to certain operations at tenant B. For example the cross-tenant policy may indicate that the user 204 can access a shared communication channel of tenant B but cannot search a directory of users of tenant B. The following code illustrates an example of cross-tenant policy for tenant B:

```
XTAP Policy:
    ToMyTenant:
        AllowSharedChannel : true
        AllowPeopleSearch: false
        AllowPeopleCard: true
```

The authentication object builder 314 forms an identity object based on a user identifier of the user 204, resource and home tenant identifiers (e.g., tenant A, tenant B), and permission rights as indicated in the cross-tenant policy. The server-side service application 118 provides the user 204 with access to shared services based on the identity object.

Figure 4:
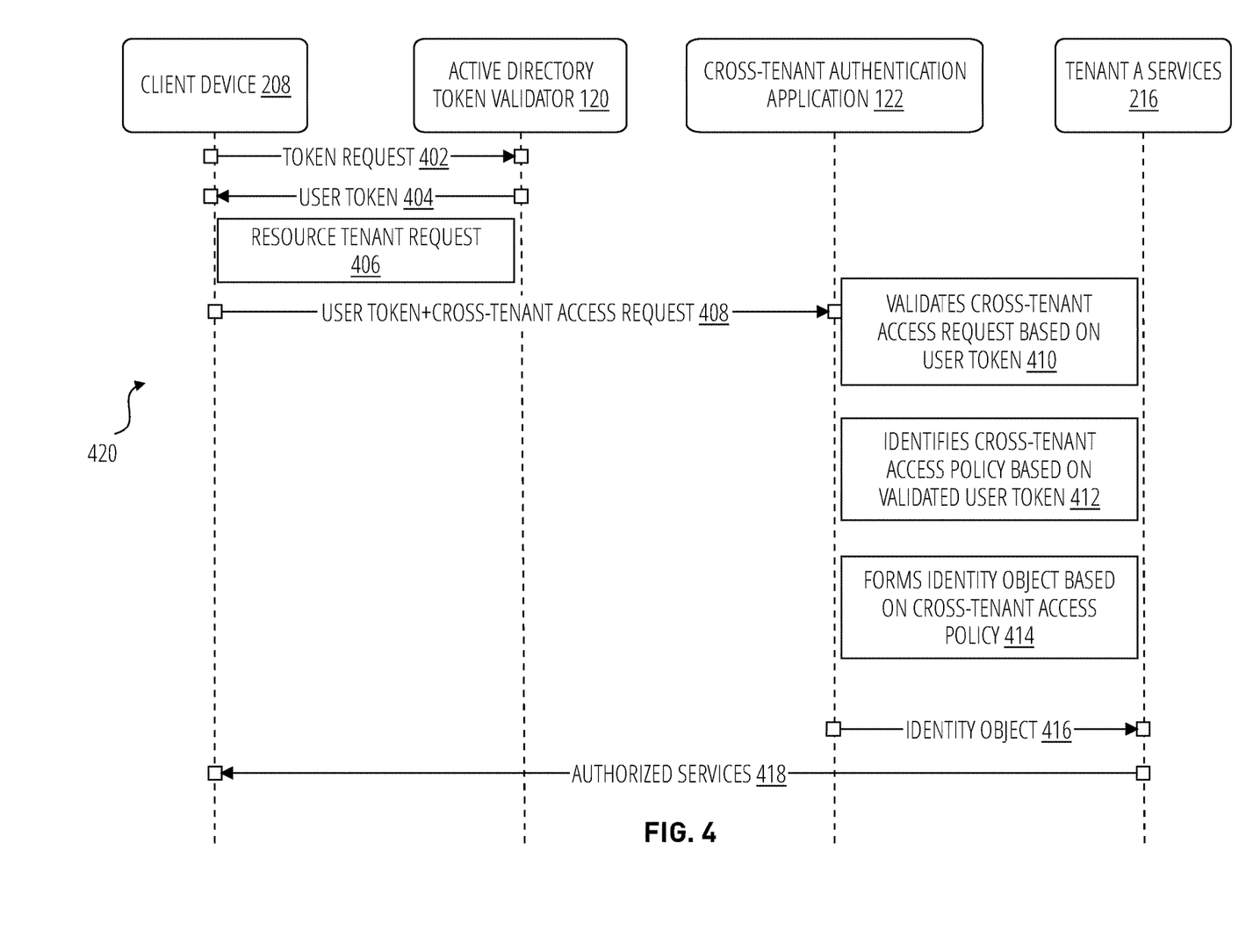
FIG. 4 illustrates an interaction diagram in accordance with one example embodiment.

FIG. 4 illustrates an interaction diagram 420 in accordance with one example embodiment. The interaction diagram 420 illustrates operations and interactions between the client device 208, the active directory token validator 120, the cross-tenant authentication application 122, and the tenant A services 216. The client device 208 of user 204 associated with tenant B requests a user token (e.g., token request 402) as part of its validation/authentication process with the active directory token validator 120 in accessing its home tenant (e.g., tenant B). The active directory token validator 120 sends the user token 404 to the client device 208. The client device 208 seeks to access services from another tenant (e.g., tenant B) and generates resource tenant request 406. The client device 208 submits the user token+ cross-tenant access request 408 to the cross-tenant authentication application 122. The cross-tenant authentication application 122 validates cross-tenant access request based on user token 410. The cross-tenant authentication application 122 identifies cross-tenant access policy based on validated user token 412. The cross-tenant authentication application 122 forms identity object based on cross-tenant access policy 414. The cross-tenant authentication application 122 sends the identity object 416 to the tenant A services 216. The tenant A services 216 provides authorized services 418 to the client device 208.

Figure 5:
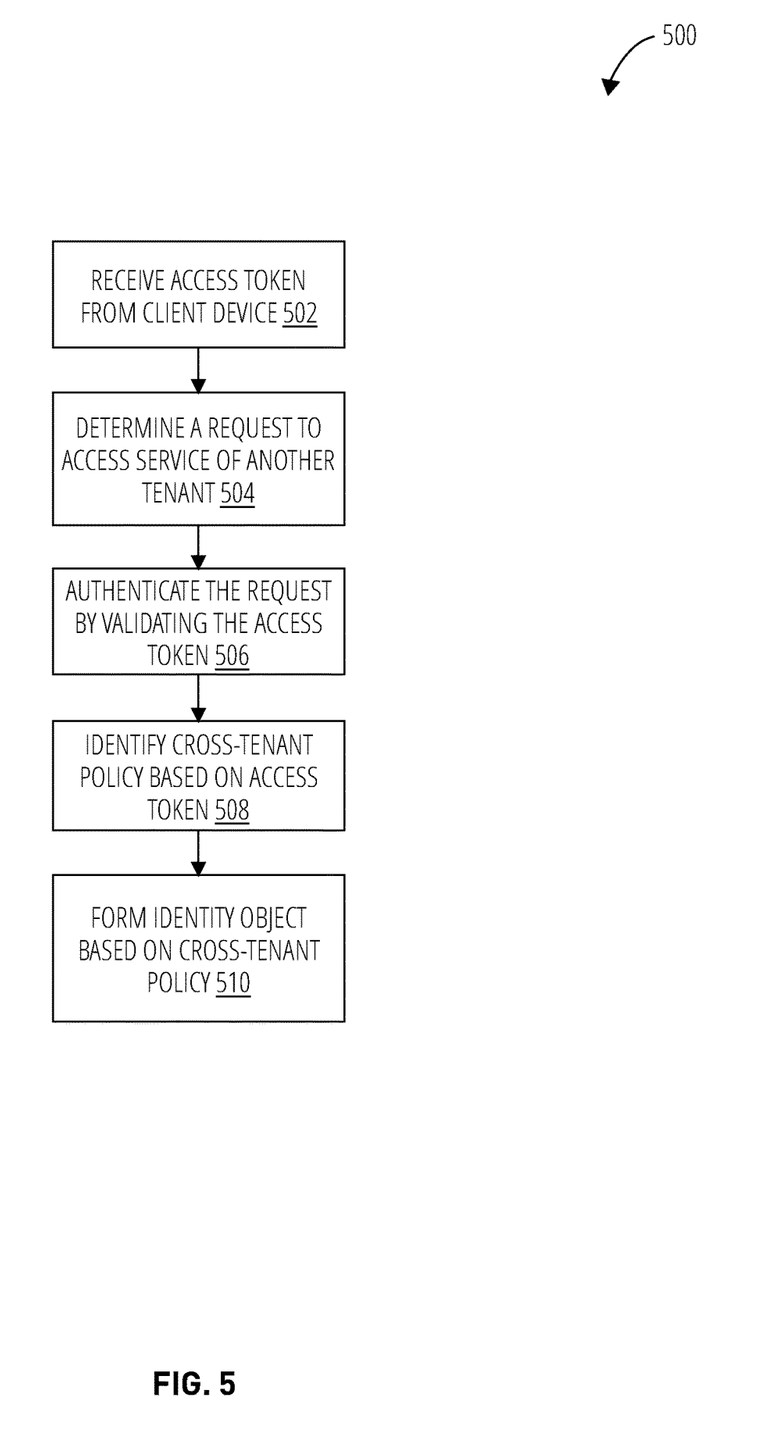
FIG. 5 is a flow diagram illustrating a method for generating an identity object in accordance with one example embodiment.

FIG. 5 is a flow diagram illustrating a method 500 for generating an identity object in accordance with one example embodiment. Operations in the method 500 may be performed by the cross-tenant authentication application 122, using Components (e.g., modules, engines) described above with respect to FIG. 3. Accordingly, the method 500 is described by way of example with reference to the cross-tenant authentication application 122. However, it shall be appreciated that at least some of the operations of the method 500 may be deployed on various other hardware configurations or be performed by similar Components residing elsewhere. For example, some of the operations may be performed at the server-side service application 118.

In block 502, the cross-tenant authentication application 122 receives an access token from a client device. At block 504, the cross-tenant authentication application 122 determines that the client is requesting access to services of another tenant. At block 506, the cross-tenant authentication application 122 authenticates the request by validating the access token. At block 508, the cross-tenant authentication application 122 identifies the cross-tenant policy based on the request and/or access token. At block 510, the cross-tenant authentication application 122 forms an identity object based on the identified cross-tenant policy.

Figure 6:
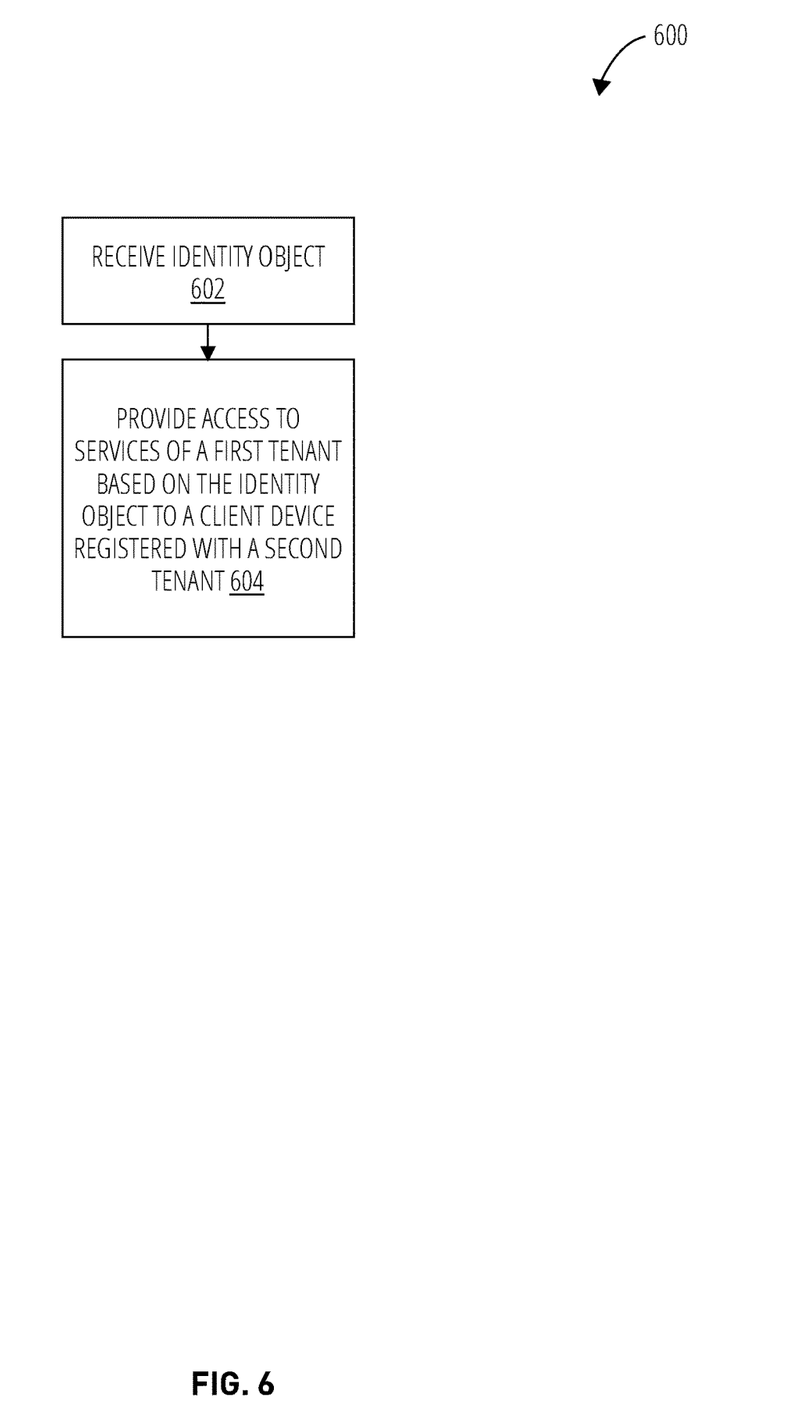
FIG. 6 is a flow diagram illustrating a method for accessing services using an identity object in accordance with one example embodiment.

FIG. 6 is a flow diagram illustrating a method 600 for accessing services using an identity object in accordance with one example embodiment. Operations in the method 600 may be performed by the server-side service application 118 and the cross-tenant authentication application 122, using Components (e.g., modules, engines) described above with respect to FIG. 3. Accordingly, the method 600 is described by way of example with reference to the server-side service application 118 and the cross-tenant authentication application 122. However, it shall be appreciated that at least some of the operations of the method 600 may be deployed on various other hardware configurations or be performed by similar Components residing elsewhere.

At block 602, the server-side service application 118 receives an identity object from the cross-tenant authentication application 122. At block 604, the server-side service application 118 provides access to the services of a first tenant based on the identity object to a client device registered with a second tenant.

Figure 7:
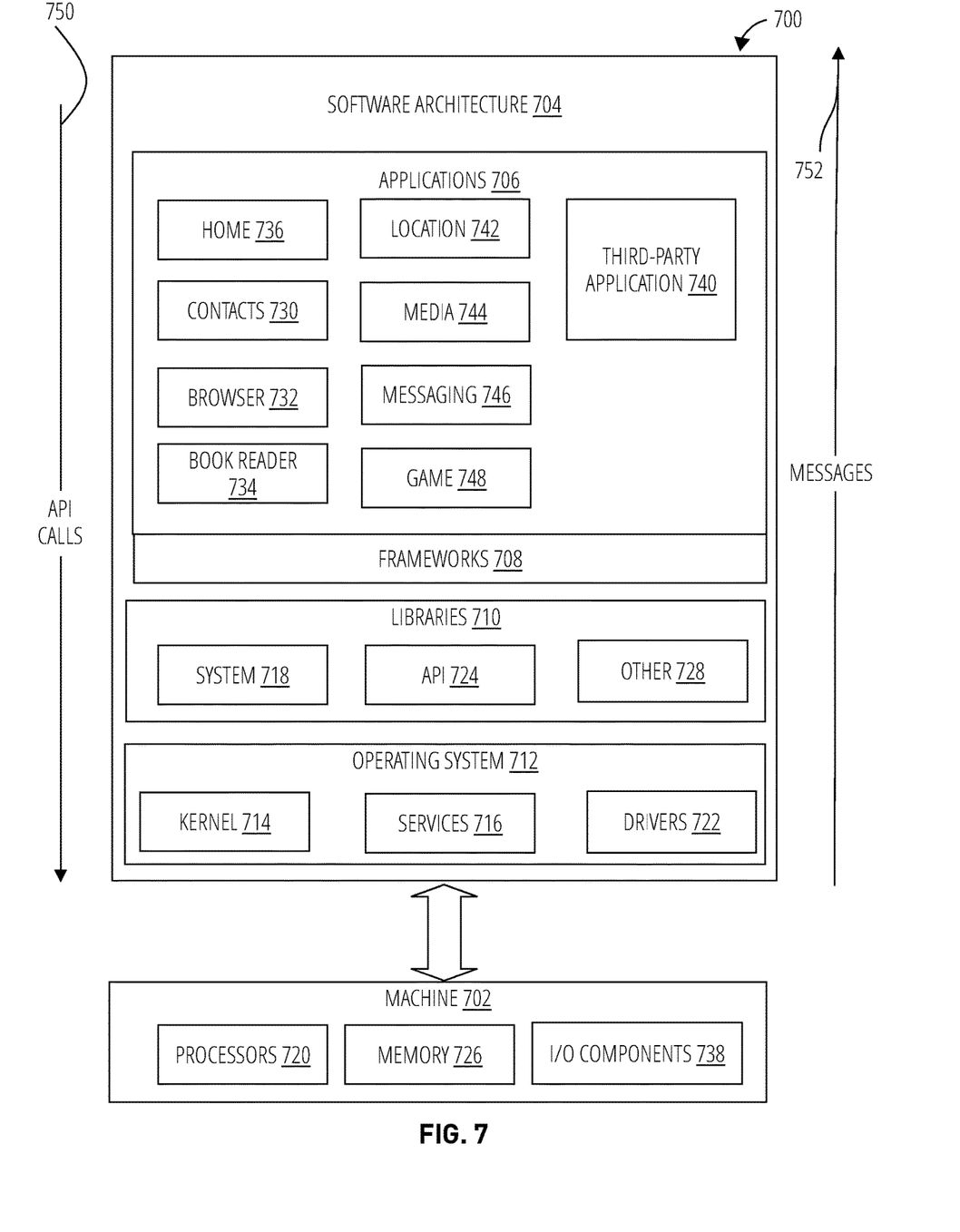
FIG. 7 is block diagram showing a software architecture within which the present disclosure may be implemented, according to an example embodiment.

FIG. 7 is a block diagram 700 illustrating a software architecture 704, which can be installed on any one or more of the devices described herein. The software architecture 704 is supported by hardware such as a machine 702 that includes Processors 720, memory 726, and I/O Components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, Processor management (e.g., scheduling), Component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 710 provide a low-level common infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a high-level common infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example embodiment, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Figure 8:
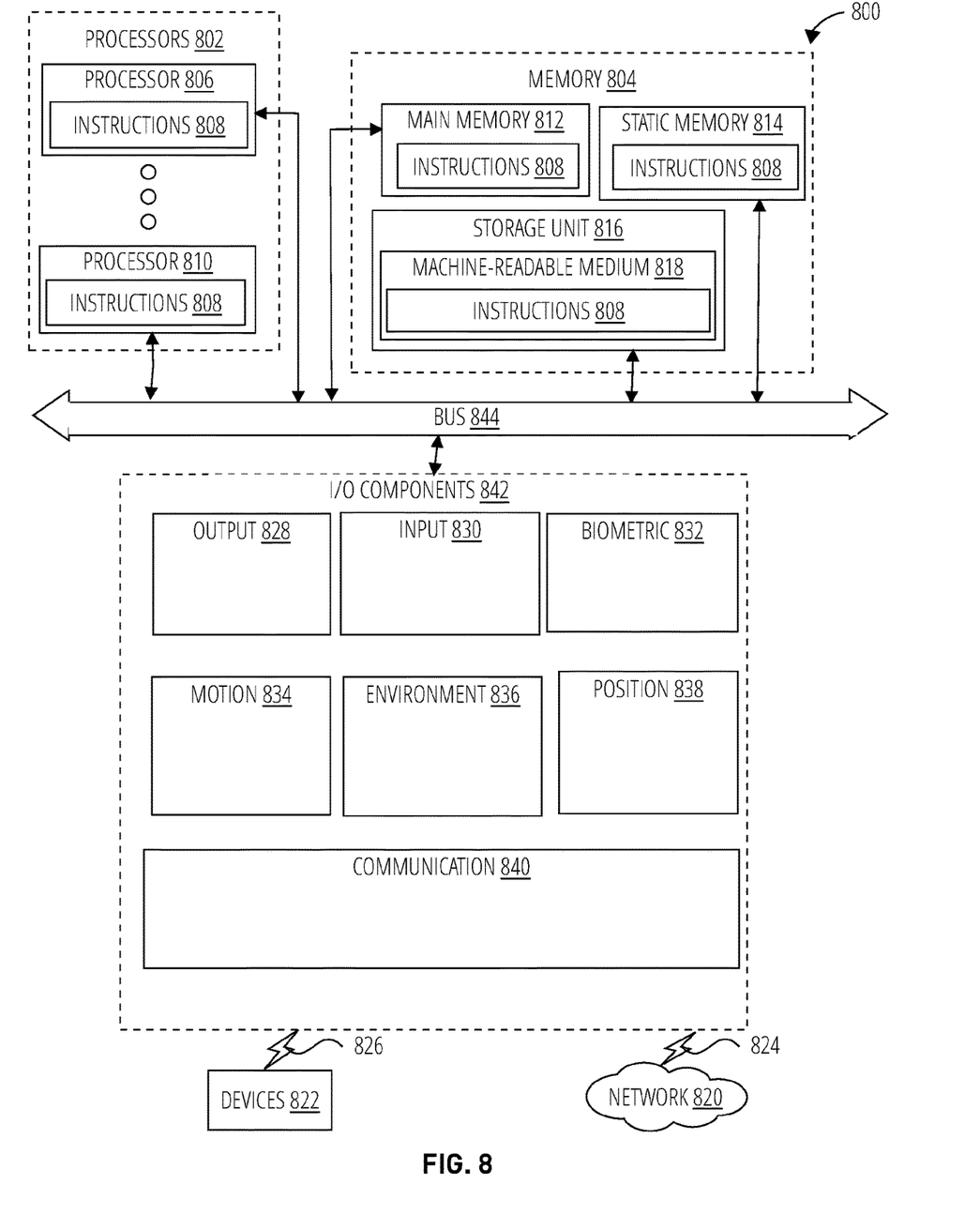
FIG. 8 is a diagrammatic representation of a machine in the form of a computer system within which a set of instructions may be executed for causing the machine to perform any one or more of the methodologies discussed herein, according to an example embodiment.

FIG. 8 is a diagrammatic representation of the machine 800 within which instructions 808 (e.g., software, a program, an application, an applet, an app, or other executable code) for causing the machine 800 to perform any one or more of the methodologies discussed herein may be executed. For example, the instructions 808 may cause the machine 800 to execute any one or more of the methods described herein. The instructions 808 transform the general, non-programmed machine 800 into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines that individually or jointly execute the instructions 808 to perform any one or more of the methodologies discussed herein.

The machine 800 may include Processors 802, memory 804, and I/O Components 842, which may be configured to communicate with each other via a bus 844. In an example embodiment, the Processors 802 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 806 and a Processor 810 that execute the instructions 808. The term "Processor" is intended to include multi-core Processors that may comprise two or more independent Processors (sometimes referred to as "cores") that may execute instructions contemporaneously. Although FIG. 8 shows multiple Processors 802, the machine 800 may include a single Processor with a single core, a single Processor with multiple cores (e.g., a multi-core Processor), multiple Processors with a single core, multiple Processors with multiples cores, or any combination thereof.

The memory 804 includes a main memory 812, a static memory 814, and a storage unit 816, both accessible to the Processors 802 via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the Processors 802 (e.g., within the Processor's cache memory), or any suitable combination thereof, during execution thereof by the machine 800.

The I/O Components 842 may include a wide variety of Components to receive input, provide output, produce output, transmit information, exchange information, capture measurements, and so on. The specific I/O Components 842 that are included in a particular machine will depend on the type of machine. For example, portable machines such as mobile phones may include a touch input device or other such input mechanisms, while a headless server machine will likely not include such a touch input device. It will be appreciated that the I/O Components 842 may include many other Components that are not shown in FIG. 8. In various example embodiments, the I/O Components 842 may include output Components 828 and input Components 830. The output Components 828 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input Components 830 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O Components 842 may include biometric Components 832, motion Components 834, environmental Components 836, or position Components 838, among a wide array of other Components. For example, the biometric Components 832 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion Components 834 include acceleration sensor Components (e.g., accelerometer), gravitation sensor Components, rotation sensor Components (e.g., gyroscope), and so forth. The environmental Components 836 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position Components 838 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O Components 842 further include communication Components 840 operable to couple the machine 800 to a network 820 or devices 822 via a coupling 824 and a coupling 826, respectively. For example, the communication Components 840 may include a network interface Component or another suitable device to interface with the network 820. In further examples, the communication Components 840 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 822 may be another machine or any of a wide variety of peripheral devices (e.g., a peripheral device coupled via a USB).

Moreover, the communication Components 840 may detect identifiers or include Components operable to detect identifiers. For example, the communication Components 840 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection Components (e.g., microphones to identify tagged audio signals). In addition, a variety of information may be derived via the communication Components 840, such as location via Internet Protocol (IP) geolocation, location via Wi-Fi® signal triangulation, location via detecting an NFC beacon signal that may indicate a particular location, and so forth.

The various memories (e.g., memory 804, main memory 812, static memory 814, and/or memory of the Processors 802) and/or storage unit 816 may store one or more sets of instructions and data structures (e.g., software) embodying or used by any one or more of the methodologies or functions described herein. These instructions (e.g., the instructions 808), when executed by Processors 802, cause various operations to implement the disclosed embodiments.

The instructions 808 may be transmitted or received over the network 820, using a transmission medium, via a network interface device (e.g., a network interface Component included in the communication Components 840) and using any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

EXAMPLES

Example 1 is a computer-implemented method comprising: receiving a user token from a client device that is registered with a first tenant of a service application of a server, the user token being provided to the client device by a directory service application after validating the client device; receiving a request, from the client device, to access a second feature of a second tenant of the service application, the second feature of the second tenant of the service application being separate from a first feature of the first tenant of the service application, the second feature being only accessible to devices registered with the second tenant of the service application; authenticating the request by validating the user token from the client device; in response to validating the user token, determining a cross-tenant policy of the second tenant of the service application based on the user token; and forming, at the server, an identity object based on the cross-tenant policy, the identity object comprising a permission value of a permission attribute that identifies a level of access to the second feature of the second tenant of the service application to the client device.

Example 2 includes example 1, further comprising: providing the identity object to the service application associated with the second tenant; determining that the permission value of the permission attribute in the identity object indicates enabling the access to the second feature of the second tenant of the service application to the client device; and allowing the client device to access the second feature of the second tenant of the service application in response to determining that the permission value of the permission attribute in the identity object indicates enabling the access to the second feature of the second tenant of the service application to the client device.

Example 3 includes any of the above examples, further comprising: accessing a cross-tenant library that maps permission rights of features of the service application of the second tenant to users of the first tenant, wherein the cross-tenant policy is determined based on a permission right of the features of the service application of the second tenant mapped to the first tenant.

Example 4 includes any of the above examples, further comprising: accessing a cross-tenant library that maps permission rights of features of the service application of the second tenant to the user identified in the user token, wherein the cross-tenant policy is determined based on a permission right of the features of the service application of the second tenant mapped to the user associated with the user token.

Example 5 includes any of the above examples, further comprising: accessing a cross-tenant permission map; and identifying, from the cross-tenant permission map, a cross-tenant API metadata associated with the second tenant, the cross-tenant API metadata indicating a cross-tenant access permission right for the second tenant.

Example 6 includes any of the above examples, wherein the directory service application is configured to manage security rights for users of the service application, wherein the first tenant indicates a first group of users of a first organization, wherein the second tenant indicates a second group of users of a second organization.

Example 7 includes any of the above examples, wherein the service application comprises a communication application, wherein the second feature of the second tenant of the service application comprises a second communication channel of the communication application, wherein the request indicates accessing the second communication channel of the communication application.

Example 8 includes any of the above examples, wherein the service application comprises a file sharing application, wherein the second feature of the file sharing application comprises a file storage, wherein the request indicates accessing a file of the file storage.

Example 9 includes any of the above examples, wherein the identity object identifies: a user identifier associated with the user token, the first tenant that indicates a home tenant of a user associated with the user identifier, the second tenant that indicates a resource tenant for the user associated with the user identifier, the service application, and permission access rights to the service application of the second tenant.

Example 10 includes any of the above examples, further comprising: receiving the permission value of the permission attribute indicating the permission level of the second feature of the second tenant of the service application for users outside the second tenant; updating a cross-tenant library that maps a permission right of the second feature of the second tenant of the service application to users of the first tenant of the service application; and updating the identity object based on the updated cross-tenant library.

Example 11 is a computing apparatus comprising: a processor; and a memory storing instructions that, when executed by the processor, configure the apparatus to: receive a user token from a client device that is registered with a first tenant of a service application of a server, the user token being provided to the client device by a directory service application after validating the client device; receive a request, from the client device, to access a second feature of a second tenant of the service application, the second feature of the second tenant of the service application being separate from a first feature of the first tenant of the service application, the second feature being only accessible to devices registered with the second tenant of the service application; authenticate the request by validating the user token from the client device; in response to validating the user token, determine a cross-tenant policy of the second tenant of the service application based on the user token; and form, at the server, an identity object based on the cross-tenant policy, the identity object comprising a permission value of a permission attribute that identifies a level of access to the second feature of the second tenant of the service application to the client device.

Example 12 includes example 11, wherein the instructions further configure the apparatus to: provide the identity object to the service application associated with the second tenant; determine that the permission value of the permission attribute in the identity object indicates enabling the access to the second feature of the second tenant of the service application to the client device; and allow the client device to access the second feature of the second tenant of the service application in response to determining that the permission value of the permission attribute in the identity object indicates enabling the access to the second feature of the second tenant of the service application to the client device.

Example 13 includes any of the above examples, wherein the instructions further configure the apparatus to: access a cross-tenant library that maps permission rights of features of the service application of the second tenant to users of the first tenant, wherein the cross-tenant policy is determined based on a permission right of the features of the service application of the second tenant mapped to the first tenant.

Example 14 includes any of the above examples, wherein the instructions further configure the apparatus to: access a cross-tenant library that maps permission rights of features of the service application of the second tenant to the user identified in the user token, wherein the cross-tenant policy is determined based on a permission right of the features of the service application of the second tenant mapped to the user associated with the user token.

Example 15 is a non-transitory computer-readable storage medium, the computer-readable storage medium including instructions that when executed by a computer, cause the computer to: receive a user token from a client device that is registered with a first tenant of a service application of a server, the user token being provided to the client device by a directory service application after validating the client device; receive a request, from the client device, to access a second feature of a second tenant of the service application, the second feature of the second tenant of the service application being separate from a first feature of the first tenant of the service application, the second feature being only accessible to devices registered with the second tenant of the service application; authenticate the request by validating the user token from the client device; in response to validating the user token, determine a cross-tenant policy of the second tenant of the service application based on the user token; and form, at the server, an identity object based on the cross-tenant policy, the identity object comprising a permission value of a permission attribute that identifies a level of access to the second feature of the second tenant of the service application to the client device.

What is claimed is:

1. A computer-implemented method comprising:
    receiving, at a cross-tenant authentication application provided on a server:
        a user token from a client device that is registered with a first tenant of a service application provided on the server, the user token implying permission to access one or more first services of the first tenant, and
        a request from the client device to access a second service of a second tenant of the service application, the second service of the second tenant of the service application being separate from the one or more first services of the first tenant of the service application, the second service being only accessible to devices registered with the second tenant of the service application; and
    by the cross-tenant authentication application:
        authenticating the request by validating the user token from the client device;
        in response to validating the user token, determining a cross-tenant policy of the second tenant of the service application based on the user token by accessing a cross-tenant permission map and identifying, from the cross-tenant permission map, cross-tenant API metadata associated with the second tenant, the cross-tenant API metadata indicating cross-tenant access rights for the second tenant;
        forming an identity object based on the cross-tenant policy, the identity object comprising: a user identifier associated with the user token, an identifier of the first tenant, an identifier of the second tenant, and an access right to the second service of the second tenant; and
        providing the identity object to the service application to cause the service application to provide access to the second service associated with the second tenant to the client device.

2. The computer-implemented method of claim 1, wherein providing access to the second service associated with the second tenant to the client device comprises:
    determining that a permission value of a permission attribute in the access right of the identity object indicates enabling the access to a particular feature of the second service of the second tenant of the service application to the client device; and
    allowing the client device to access the particular feature of the second service of the second tenant of the service application in response to determining that the permission value of the permission attribute indicates enabling the access to the second service of the second tenant of the service application to the client device.

3. The computer-implemented method of claim 1, further comprising:
    accessing a cross-tenant library that maps access rights to features of the second service of the second tenant to users of the first tenant, wherein the cross-tenant policy is determined based on an access right to the features of the second service of the second tenant mapped to the first tenant.

4. The computer-implemented method of claim 1, further comprising:
    accessing a cross-tenant library that maps access rights to features of the second service of the second tenant to the user identified in the user token, wherein the cross-tenant policy is determined based on an access right to the features of the second service of the second tenant mapped to the user associated with the user token.

5. The computer-implemented method of claim 1, wherein the user token has been provided to the client device by a directory service application configured to manage security rights for users of the service application,
    wherein the first tenant indicates a first group of users of a first organization, wherein the second tenant indicates a second group of users of a second organization.

6. The computer-implemented method of claim 1, wherein the service application comprises a communication application, wherein the second service of the second tenant of the service application comprises a second communication channel of the communication application, wherein the request indicates accessing the second communication channel of the communication application.

7. The computer-implemented method of claim 1, wherein the service application comprises a file sharing application, wherein the second service of the second tenant of the service application comprises a file storage of the file sharing application, wherein the request indicates accessing a file of the file storage.

8. The computer-implemented method of claim 1, further comprising:
    receiving a permission value of a permission attribute indicating a permission level of the second service of the second tenant of the service application for users outside the second tenant;
    updating a cross-tenant library that maps an access right of the second service of the second tenant of the service application to users of the first tenant of the service application; and
    updating the identity object based on the updated cross-tenant library.

9. A computing apparatus of a server, the apparatus comprising:
    a processor; and
    a memory storing a cross-tenant authentication application comprising instructions that, when executed by the processor, configure the apparatus to:
    receive a user token from a client device that is registered with a first tenant of a service application provided on the server, the user token implying permission to access one or more first services of the first tenant, and a request from the client device to access a second service of a second tenant of the service application, the second service of the second tenant of the service application being separate from the one or more first services of the first tenant of the service application, the second service being only accessible to devices registered with the second tenant of the service application;
    authenticate the request by validating the user token from the client device;
    in response to validating the user token, determine a cross-tenant policy of the second tenant of the service application based on the user token by accessing a cross-tenant permission map and identify, from the cross-tenant permission map, cross-tenant API metadata associated with the second tenant, the cross-tenant API metadata indicating cross-tenant access rights for the second tenant;
    form an identity object based on the cross-tenant policy, the identity object comprising: a user identifier associated with the user token, an identifier of the first tenant, an identifier of the second tenant, and an access right to the second service of the second tenant; and
    provide the identity object to the service application to cause the service application to provide access to the second service associated with the second tenant to the client device.

10. The computing apparatus of claim 9, wherein the memory further stores the service application, the service application comprising instructions that further configure the apparatus to:
    determine that a permission value of a permission attribute in the access right of the identity object indicates enabling the access to a particular feature of the second service of the second tenant of the service application to the client device; and
    allow the client device to access the particular feature of the second service of the second tenant of the service application in response to determining that the permission value of the permission attribute indicates enabling the access to the second service of the second tenant of the service application to the client device.

11. The computing apparatus of claim 9, wherein the instructions further configure the apparatus to:
    access a cross-tenant library that maps access rights to features of the second service of the second tenant to users of the first tenant, wherein the cross-tenant policy is determined based on an access right of the features of the second service of the second tenant mapped to the first tenant.

12. The computing apparatus of claim 9, wherein the instructions further configure the apparatus to:
    access a cross-tenant library that maps access rights of features of the second service of the second tenant to the user identified in the user token, wherein the cross-tenant policy is determined based on an access right of the features of the second service of the second tenant mapped to the user associated with the user token.

13. A non-transitory computer-readable storage medium, the computer-readable storage medium including a cross-tenant authentication application comprising instructions that when executed by a computer, cause the computer to perform operations comprising:
    receive a user token from a client device that is registered with a first tenant of a service application provided on the server, the user token implying permission to access one or more first services of the first tenant, and a request from the client device to access a second service of a second tenant of the service application, the second service of the second tenant of the service application being separate from the one or more first services of the first tenant of the service application, the second service being only accessible to devices registered with the second tenant of the service application;

authenticate the request by validating the user token from the client device;

in response to validating the user token, determine a cross-tenant policy of the second tenant of the service application based on the user token by accessing a cross-tenant permission map and identify, from the cross-tenant permission map, cross-tenant API metadata associated with the second tenant, the cross-tenant API metadata indicating cross-tenant access rights for the second tenant;

form an identity object based on the cross-tenant policy, the identity object comprising: a user identifier associated with the user token, an identifier of the first tenant, an identifier of the second tenant, and an access right to the second service of the second tenant; and provide the identity object to the service application to cause the service application to provide access to the second service associated with the second tenant to the client device.

* * * * *